Aug. 27, 1957
P. D. MAY ET AL
2,804,491
ETHYLATION PROCESS
Filed Sept. 14, 1956
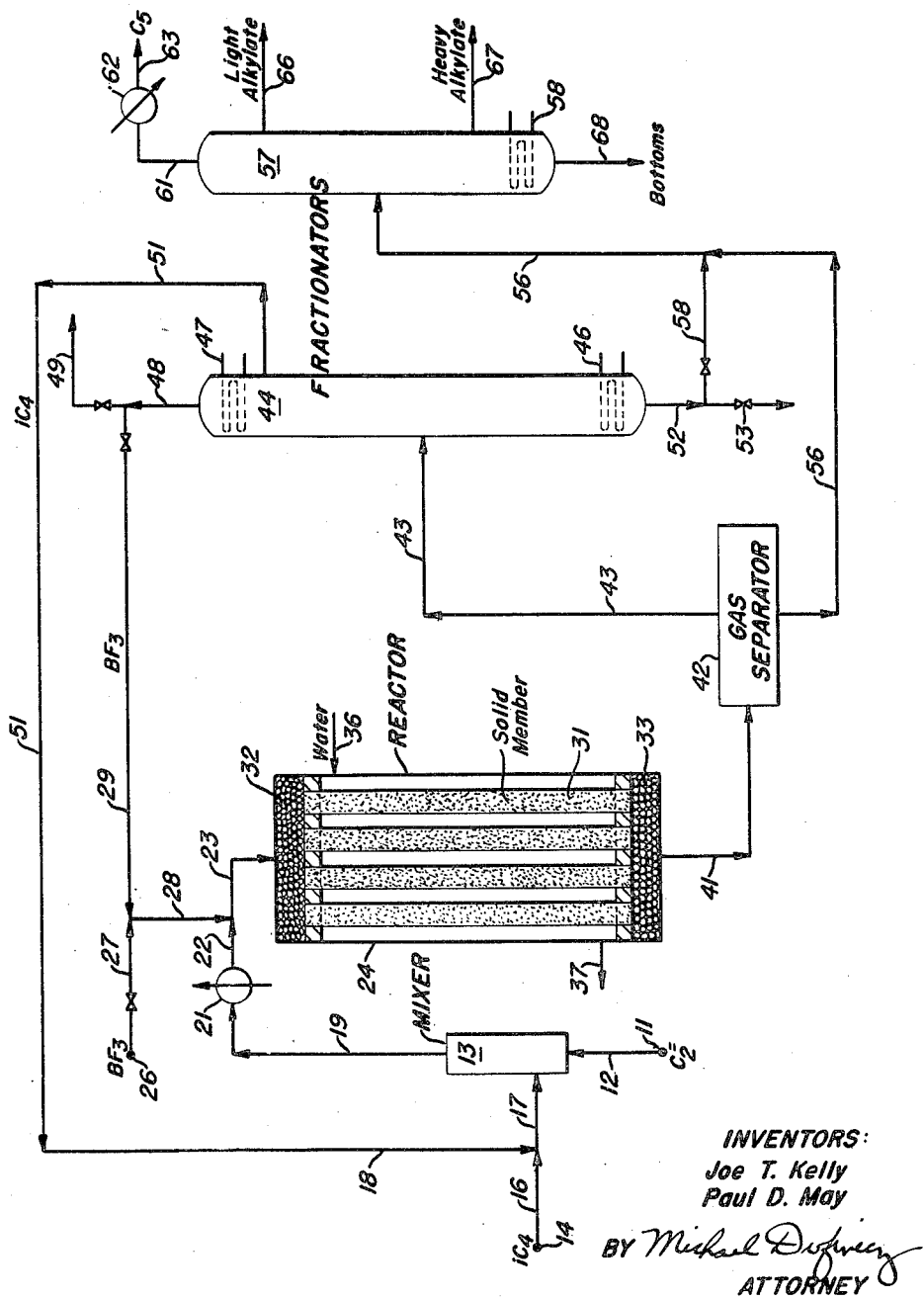
INVENTORS:
Joe T. Kelly
Paul D. May
BY Michael Dufresne
ATTORNEY United States Patent Office 2,804,491
Patented Aug. 27, 1957

2,804,491

ETHYLATION PROCESS

Paul D. May, Galveston, and Joe T. Kelly, Dickinson, Tex., assignors to The American Oil Company, Texas City, Tex., a corporation of Texas Application September 14, 1956, Serial No. 610,004

9 Claims. (Cl. 260—683.4)

This invention relates to the reaction of isoparaffins and olefins. More particularly it relates to the alkylation of isobutane with ethylene.

In the petroleum industry today, the octane race has placed a strain on facilities and materials needed to make gasoline meeting present day automotive engine requirements. One of the remaining sources of high octane components is the product of the alkylation of isobutane and ethylene. This alkylation is not easy to carry out, particularly on a large scale.

An object of the invention is the alkylation of isoparaffins, particularly isobutane, with olefins, particularly ethylene. Other objects will become apparent in the course of the detailed description.

The alkylation of isoparaffins with olefins is carried out in the presence of a novel catalyst pair. One member of the catalyst pair is boron trifluoride. The other member of the catalyst pair is a solid silica stabilized gel alumina containing between about 10 and 60 weight percent of $BF_3$, based on alumina. It is believed that the solid member is a complex of the silica stabilized gel alumina and $BF_3$. The defined solid member has slight catalytic powers in the absence of free $BF_3$.

Boron trifluoride is one member of the catalyst pair. Commercial grade anhydrous boron trifluoride is suitable for use as this member of the catalyst pair.

The other member of the catalyst pair, hereinafter spoken of as the solid member, is an "apparently stable" complex of $BF_3$ and silica stabilized gel alumina; the solid member contains between about 10 and 60 weight percent of combined $BF_3$, calculated on the alumina component. The silica stabilized gel alumina used herein is described in detail in U. S. 2,398,610 and is available commercially from several catalyst suppliers.

Boron trifluoride and the defined alumina react to form a solid material containing combined $BF_3$. When the alumina and $BF_3$ are contacted in a closed vessel, the $BF_3$ partial pressure drops very rapidly at first and then gradually approaches a constant value. It appears that a rapid reaction between the $BF_3$ and the alumina takes place because all the $BF_3$ cannot be driven off the alumina even at calcining temperatures.

The complex of the defined alumina and $BF_3$ is not an effective catalyst for alkylation in the absence of free-$BF_3$. Free-$BF_3$ is to be understood as $BF_3$ existing in the reaction zone which is not combined with the defined alumina. As soon as the defined alumina has combined with $BF_3$ to the extent of about 10% by weight based on alumina, the beneficial catalytic effect exists. Free-$BF_3$ may exist in the reaction zone, as evidenced by the formation of alkylate, even though the alumina has not combined with $BF_3$ to the maximum extent. In a batch system, wherein less $BF_3$ is present than is theoretically required to combine with the defined alumina, eventually no alkylation will occur as charge is added, since all of the $BF_3$ will become combined.

In general, the process is carried out utilizing an amount of $BF_3$ which is in excess of that required to combine with the defined alumina present in the contacting zone. More than the minimum amount of free-$BF_3$ is beneficial, in fact, the yield of alkylate increases rapidly with increase in the free-$BF_3$ present, up to a maximum amount. The amount of free-$BF_3$ used is dependent somewhat upon the reactants themselves. It is preferred to use between about 0.5 and 5 parts by weight of olefin per part of free-$BF_3$ when utilizing the lower molecular weight olefins, such as ethylene and propylene.

The temperature of operation may be as low as —20° C. or even lower. Temperatures as high as 150° C. and even higher may be used. More usually the temperature of operation will be between about 0° C. and 50° C. Lower temperatures appear to favor the formation of the hydrocarbons having 6 to 7 carbon atoms. It is preferred to operate at a temperature between about 0° C. and 25° C.

Sufficient pressure is maintained on the system to keep a substantial portion of the hydrocarbons charged in the liquid state. The process may be carried out at relatively low pressures, for example, 100 p. s. i., or it may be carried out at elevated pressures, for example, 2000 p. s. i., or more. In general, pressures will be between about 200 and 1000 p. s. i. and preferably between about 300 and 600 p. s. i.

The contacting of the isoparaffin and the olefin in the presence of the defined catalyst pair is continued until an appreciable amount of alkylate has been formed. In batch reactions, it is possible to convert substantially 100% of the olefin by a sufficiently long period of contacting. When operating in a continuous flow system, it may be desirable to have a time of contacting such that substantial amounts of olefin are not converted and obtain the complete conversion of the olefin by a recycle operation. The time of reaction will be determined by the type of hydrocarbons charged, the ratio of isoparaffin to olefin, the degree of mixing in the contacting zone and the catalyst usage. A few tests will enable one to determine the optimum time of contacting for the particular system of operating conditions being tried.

The reactants in the hydrocarbon charge to the alkylation process are isoparaffin and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. The catalyst pair is particularly effective with ethylene.

The isoparaffin reactant is defined as a paraffinic hydrocarbon which has a tertiary hydrogen atom, i. e., paraffins which have a hydrogen atom attached to a tertiary carbon atom. Examples of these are isobutane, isopentane (2-methylbutane), 2-methylpentane, 2-methylhexane, 3-methylhexane, 2,3-dimethylbutane (di-isopropyl) and 2,4-dimethylhexane. Thus the isoparaffins usable as one reactant in the process contain from 4 to 8 carbon atoms.

The alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 5 and 15.

The presence of non-reactive hydrocarbons in the hydrocarbon charge is not detrimental unless the ractants become excessively diluted. For example, the isoparaffin may also contain isomers of the normal configuration. The olefins may contain paraffins of the same carbon number. Mixtures of 2 or more isoparaffins or 2 or more olefins may be charged. In general, when a particular product distribution is desired, it is preferable to operate with a single isoparaffin and a single olefin, for example, isobutane and ethylene, both of about 95% purity.

The reactants may be mixed together before they are charged into the reactor. Or, they may be charged into the reactor separately, or a portion of the olefins may be blended with the isoparaffin before introduction into the reactor and the remainder of the olefin injected into the reactor. The charge may be introduced all at one point into the reactor or it may be introduced at two or more points. The alkylation reaction is exothermic and temperature control is facilitated by introducing the olefin into the reactor at more than one point.

The free-$BF_3$ member of the catalyst pair may be premixed with the isoparaffin and olefin before introducing these into the reactor but this should not be done when an extremely reactive system such as isobutanes and isobutylene are being used; or when an olefin that is very rapidly polymerizable is being used. The $BF_3$ may be blended with the isoparaffin reactant and introduced into the reactor with this member when the isoparaffin and the olefins are being introduced separately. The $BF_3$ may also be introduced directly into the reaction zone independently from the hydrocarbons charged. The $BF_3$ may be introduced into the reactor at a single point or at several points to help control temperature and reaction rate.

The reactor may be a vessel providing for a batch-type reaction, i. e., one wherein the desired amount of isoparaffin and olefin are charged to a closed vessel containing the catalyst pair and the vessel then maintained at the desired temperature for the desired time. At the end of this time, the hydrocarbon product mixture and unreacted materials are withdrawn from thet vessel and processed to separate the alkylate product from the unreacted materials and lower and higher molecular weight materials. The reactor may be a fixed bed type wherein the reactants and free-$BF_3$ are flowed through the bed of the solid member of the catalyst pair, the space velocity being controlled so that the desired amount of reaction is obtained during the passage of the reactants through the bed. Under some conditions, a moving bed may be utilized. In still another set of circumstances, a fluidized bed of the solid member may be utilized with the incoming stream of reactants providing the energy for the fluidization of the solid member. Other methods of operation common in the catalytic refining aspects of the petroleum industry utilizing solid catalysts may be readily devised.

It has been pointed out that the solid member of the catalyst pair is really a complex or compound of the defined alumina and $BF_3$. The complex may be preformed, by exposing the alumina to $BF_3$ for a time sufficient to introduce some $BF_3$ into the alumina or even enough to "saturate" the alumina, this being done before the reactants are introduced into the reaction zone or even before the alumina is positioned in the reaction zone. The solid member may be formed in situ during a batch-type reaction. In the batch-type operation, it is convenient to introduce all the $BF_3$ into the reaction vessel at once. This amount of $BF_3$ is sufficient not only to combine with the alumina but also provide the desired amount of free-$BF_3$. In a flow system, the solid member may be prepared in situ by charging fresh alumina to the reaction zone and forming the complex during the initial passage of reactants and $BF_3$ over the alumina. As the flow of reactants and $BF_3$ continues over the alumina, eventually the alumina will become saturated with respect to $BF_3$. At this time, the amount of $BF_3$ introduced into the reaction zone should be cut back to that amount of free-$BF_3$ desired, under this particular set of operating conditions.

The illustrative embodiment set out in the annexed figure forms a part of this specification. It is pointed out that this embodiment is schematic in nature, that many items of process equipment have been omitted, since these may be readily added by those skilled in this art and that this embodiment is only one of many which may be devised, and that the invention is not to be limited to this particular embodiment.

In the figure, it is desired to produce a high yield of di-isopropyl for use as a blending material for gasoline. Ethylene from source 11 is passed by way of line 12 into mixer 13. Liquid isobutane from source 14 is passed by way of lines 16 and 17 into mixer 13. Both the ethylene and the isobutane are about 90% purity, the remainder being n-butane and ethane, with trace amounts of other components found in materials derived from petroleum refining sources. Mixer 13, in this instance, is a simple orifice-type mixer suitable for intermingling a liquid and a gas, or two liquids. Recycle isobutane from line 18 is passed by way of line 17 into mixer 13. In this embodiment, the molar ratio of isobutane to ethylene is 6.

From mixer 13, the blend of isobutane and ethylene is passed by way of line 19, through heat exchanger 21, where the temperature of the blend is adjusted to 10° C. The temperature of the blend leaving exchanger 21 is somewhat lower than the reaction temperature, since there is a heat rise in the reactor due to exothermic reaction. From exchanger 21, the stream of isobutane and ethylene is passed by way of lines 22 and 23 into the top of reactor 24.

Boron trifluoride is passed from source 26 by way of valved line 27 and line 28 into line 23, where it meets the stream of isobutane and ethylene. If desirable, a mixture may be introduced into line 23 to insure complete interminging of the $BF_3$ and the hydrocarbon charged. Recycle $BF_3$ is introduced from line 29 by way of lines 28 and 23. In this embodiment, the alumina which contains about 5% of silica is completely complexed with respect to $BF_3$, i. e., contains about 60% by weight of $BF_3$, based on alumina and only the necessary free-$BF_3$ is introduced by way of line 28. The weight ratio of ethylene present in line 23 to free-$BF_3$ from line 28 is 1.

Reactor 24 is shown as a shell and tube type vessel. Solid member is contained in the tubes 31. The inert alumina balls 32 and 33 are positioned above and below the headers in the reactor to maintain the solid member within the tubes. In order to maintain the temperature in the reactor at substantially 15° C., water is introduced into the shell side by way of line 36 and is withdrawn by way of line 37.

In this embodiment, the reactor was charged with silica stabilized gel alumina pellets about one-eighth inch in diameter and about one-eighth inch in height. The reactor pressure was maintained at 600 p. s. i. This permits maintaining the isobutane and substantially all of the ethylene in the liquid state.

The product hydrocarbon mixture is passed out of reactor 24 by way of line 41. This stream contains the alkylate product, unreacted isobutane, a small amount of unreacted ethylene and pentanes as well as $BF_3$. The stream from line 41 is passed into gas separator 42 where the $BF_3$, isobutane, some pentanes and some alkylate product are taken overhead by way of line 43. The material taken overhead from the separator 42 is passed into fractionator 44.

Fractionator 44 is adapted to separate the $BF_3$ as a gas, the isobutane as a liquid and the higher boiling materials as a bottoms product. Fractionator 44 is provided with an internal reboiler 46 and an internal condenser 47. $BF_3$ and unreacted ethylene are taken overhead from fractionator 44 by way of line 48 and may be passed out of the system by way of valved line 49. The material from line 49 may be periodically passed to a BF₃ purification operation to remove non-condensable inert gases which build up in the system. Ordinarily the stream from line 48 is recycled by way of valved lines 29 and lines 28 and 23 to reactor 24.

Isobutane is withdrawn as a liquid stream by way of line 51 and is recycled by way of lines 18 and 17 to mixer 13 for reuse in the process. Bottoms product from fractionator 44 is withdrawn by way of line 52 and may be passed to storage or further processing by way of valved line 53. This stream from line 52 consists substantially of isopentane. Some unsaturated C₅ hydrocarbons are also present and also a small amount of higher boiling alkylate material.

The liquids separated in gas separator 42 are passed by way of line 56 into fractionator 57. The bottoms product from fractionator 44 may be passed by way of valved line 58 and line 56 into fractionator 57 for complete removal of the alkylate material. In this embodiment, the bottoms are passed to fractionator 57.

Fractionator 57 is provided with an internal reboiler 58 and is adapted to produce the desired alkylate products from the hydrocarbon product mixture entering from line 56. A vapor stream is taken overhead by way of line 61, is condensed in cooler 62 and is passed to storage by way of line 63. The material from line 63 consists substantially of isopentane and some unsaturated C₅ material. This material may be used as a high octane blending stock for the production of motor gasoline of the desired volatility characteristics.

The alkylate product herein is considered to be that boiling above the pentane range and boiling below the maximum temperature usable in motor gasoline. In general, a 415° F. endpoint alkylate is blendable into motor gasoline without adverse effect in a specification calling for a 400° F. gasoline endpoint. Thus the alkylate product is considered to be the material boiling between about the lower limit of the hexane range and 400° F. in the ASTM distillation procedure.

Light alkylate, which includes all the C₆ material and some of the C₇ material, is withdrawn from fractionator 57 by way of line 66. Heavy alkylate, which includes most of the C₇ and material boiling up to 415° F. is withdrawn from fractionator 57 by way of line 67. A small amount of higher boiling bottoms is withdrawn by way of line 68.

In general, the C₆ fraction of the alkylate product will contain from about 80 to about 85 mole percent of diisopropyl (2,3-dimethylbutane). 2-methylpentane and 3-methylpentane represent substantially the remainder of the C₆ product. Generally, only trace amounts of n-hexane are present.

The results obtainable by the process of the instant invention are set out in illustrative tests below, the results of which are set out in the table. These tests were carried out under what are more or less standard conditions, namely, a 4-liter carbon steel bomb was dried overnight in a stream of hot air at 110° C. The solid member to be tested (150 grams) was charged to the bomb in the form of 8–14 mesh particles and the bomb was evacuated. One kilogram of a dry blend of ethylene and isobutane was added and then BF₃ (40 grams) was pressured in. The charged bombs were placed in a rocker and allowed to rock for 20 hours. At the end of this time a liquid sample was drawn through a bomb containing activated alumina (to remove dissolved BF₃ and solid particles). This sample was submitted for Podbielniak distillation. A C₆ cut from the Podbielniak distillation was analyzed by mass spectrometer. In some cases after sampling, the remaining major portion of the product was debutanized on an Oldershaw column and then fractionated on a packed column.

In the table, tests 1–3 show that the combinations of BF₃ and solid member made from silica stabilized gel alumina were very effective ethylation catalysts. The non-gel activated alumina of test 4 was ineffective. The solid member made from gel activated alumina is only a fair promoter as shown by test 5.

The alkylate from test 2 was fractionated into narrow cuts according to carbon number. The yield, as weight percent on ethylene charge, is set out herein for each cut.

Table

| Test No. | 1[1] | 2[1] | 3[1] | 4[2] | 5[3] |
|---|---|---|---|---|---|
| Isobutane/Ethylene (molar) | 2.8 | 4.3 | 2.5 | 2.5 | 2.5 |
| Ethylene/BF₃ (weight) | 3.0 | 2.1 | 2.6 | 3.7 | 3.3 |
| Hydrocarbon/Alumina (weight) | 6.8 | 7.1 | 7.0 | 7.7 | 6.7 |
| Time, Hours | 19 | 20 | 20 | 20 | 20 |
| Temperature, °C | 20–30 | 25–35 | 15–25 | 25 | 10–20 |
| Pressure range, p. s. i. g. | 275–105 | 240–100 | 250–65 | 300–200 | 290–112 |
| Ethylene converted, percent | 89 | 88 | 93 | 51 | 91 |
| Alkylate, Wt. Percent: | | | | | |
| Hexanes | 50 | 77 | 73 | 21 | 57 |
| C₇+ | 105 | 109 | 105 | 17 | 62 |
| Total | 155 | 186 | 178 | 38 | 119 |

[1] Silica stabilized gel alumina.
[2] Non-gel activated alumina.
[3] Activated gel alumina.

| | |
|---|---|
| C₆ (110°–165° F.) | 75 |
| C₇ (165°–194° F.) | 5 |
| C₈ (194°–266° F.) | 71 |
| C₉ to 415° F. | 14 |
| 415° F.+ | 18 |
| | 183 |

The C₆ cut was analyzed by mass spectrometry and found to be:

| | |
|---|---|
| 2,3-dimethylbutane | 82 |
| 2,2-dimethylbutane | 2 |
| 2-methylpentane | 6 |
| 3-methylpentane | 9 |
| Other | 1 |

Thus having described the invention, what is claimed is:

1. An alkylation process wherein an isoparaffin having from 4 to 8 carbon atoms and an olefin having from 2 to 12 carbon atoms are contacted, in a molar ratio of isoparaffin to olefin between about 2 and 50, at a temperature between about −20° C. and 150° C. and a pressure between about 100 and 2000 p. s. i., said pressure being at least sufficient to keep a substantial portion of said reactants in the liquid state, for a time sufficient to permit an appreciable amount of alkylation reaction to take place, in the presence of a catalyst comprising essentially (i) a silica stabilized gel alumina containing between about 10 and 60 weight percent of BF₃, based on said alumina, (ii) free-boron trifluoride, a product hydrocarbon mixture is removed from said contacting zone and an alkylate hydrocarbon product is separated from said mixture.

2. The process of claim 1 wherein said isoparaffin is isobutane.

3. The process of claim 1 wherein said isoparaffin is diisopropyl.

4. The process of claim 1 wherein said olefin is ethylene.

5. The process of claim 1 wherein said olefin is propylene tetramer.

6. The process of claim 1 wherein said temperature is between about 0° C. and 25° C.

7. The process of claim 1 wherein the free-boron trifluoride is present in an amount such that the free-BF₃ to olefin weight ratio is between about 0.2 to 1.5.

8. An alkylation process which comprises contacting isobutane and ethylene in a molar ratio of isobutane to ethylene between about 2 and 25 at a temperature between about 0° C. and 25° C. at a pressure between about 200 and 1000 p. s. i.; said pressure being to keep a substantial portion of said reactants in the liquid state for a time sufficient to permit an appreciable amount of alkylation reaction to take place, in the presence of a catalyst pair comprising essentially (a) a solid member consisting of silica stabilized gel alumina-$BF_3$, which member contains between about 20 and 50 weight percent $BF_3$ based on said alumina, and (b) free-boron trifluoride in an amount such that the weight ratio of ethylene to free-$BF_3$ charged is between about 0.5 and 5; removing product hydrocarbon mixture containing alkylate product from said contacting zone and separating alkylate hydrocarbon product from unreacted isobutane and ethylene.

9. The process of claim 8 wherein said temperature is between about 0° C. and 25° C.

References Cited in the file of this patent

UNITED STATES PATENTS

| | | |
|---|---|---|
| 2,390,100 | Hughes | Dec. 4, 1945 |
| 2,404,788 | Burk et al. | July 30, 1946 |
| 2,425,839 | Schulze et al. | Aug. 19, 1947 |